United States Patent
Darde et al.

(10) Patent No.: US 9,702,376 B2
(45) Date of Patent: Jul. 11, 2017

(54) APPARATUS FOR COMPRESSING A WET GAS FLOW

(71) Applicant: L'Air Liquide, Societe Anonyme Pour l'Etude et l'Exploitation des Procedes Georges Claude, Paris (FR)

(72) Inventors: Arthur Darde, Paris (FR); Cyril Defaye, Roissy-en-Brie (FR); Thomas Morel, Bry sur Marne (FR)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 441 days.

(21) Appl. No.: 14/394,309

(22) PCT Filed: Apr. 2, 2013

(86) PCT No.: PCT/FR2013/050720
§ 371 (c)(1),
(2) Date: Oct. 14, 2014

(87) PCT Pub. No.: WO2013/160577
PCT Pub. Date: Oct. 31, 2013

(65) Prior Publication Data
US 2015/0078918 A1    Mar. 19, 2015

(30) Foreign Application Priority Data
Apr. 16, 2012 (FR) .................... 12 53464

(51) Int. Cl.
*F04D 29/58* (2006.01)
*F04D 29/02* (2006.01)
(Continued)

(52) U.S. Cl.
CPC .......... *F04D 29/5833* (2013.01); *F04B 41/06* (2013.01); *F04D 13/12* (2013.01);
(Continued)

(58) Field of Classification Search
CPC ............ F04D 29/5833; F04D 29/5826; F04D 29/023; F04D 13/12; F04D 13/14;
(Continued)

(56) References Cited

U.S. PATENT DOCUMENTS 7,269,956 B2 * 9/2007 Gericke .................... F01K 7/40
                                                    60/39.182
2011/0000227 A1    1/2011 Kamiya
2011/0265477 A1 * 11/2011 Drouvot ................. F01K 17/02
                                                    60/653

FOREIGN PATENT DOCUMENTS

FR          1413608         10/1965
FR          1413608 A   *   10/1965 ......... F04D 29/5833
WO       WO2011088527       7/2011

OTHER PUBLICATIONS

FR 1253464, French Search Report and Written Opinion, Feb. 18, 2013 (6 pp).
(Continued)

*Primary Examiner* — William H Rodriguez
*Assistant Examiner* — Christopher Brunjes
(74) *Attorney, Agent, or Firm* — Justin K. Murray

(57) ABSTRACT

A method and apparatus for compressing a gas flowing comprising at least 0.1 vol % water, include a compressor containing N compression stages, in which each compression stage includes a compressing means and an exchanger directly or indirectly connected to a water-coolant circuit; and in which at least a first exchanger and a second exchanger, in first and second consecutive or non-consecutive compression stages, are connected in series to the water-coolant circuit. The exchangers, which are not connected in series to the water-coolant circuit, include at their water-coolant output a pressure drop device.

12 Claims, 2 Drawing Sheets

(51) Int. Cl.
F04D 13/12 (2006.01)
F04D 13/14 (2006.01)
F25J 3/02 (2006.01)
F04B 41/06 (2006.01)

(52) U.S. Cl.
CPC ........... *F04D 13/14* (2013.01); *F04D 29/023* (2013.01); *F04D 29/5826* (2013.01); *F25J 3/0266* (2013.01); *F25J 2230/04* (2013.01); *F25J 2230/30* (2013.01); *Y02C 10/12* (2013.01)

(58) Field of Classification Search
CPC ...... F04B 41/06; F25J 3/0266; F25J 2230/04; F25J 2230/30; Y02C 10/12
See application file for complete search history.

(56) References Cited

OTHER PUBLICATIONS

PCT/FR2013/050720, International Search Report, Jul. 29, 2013 (6 pp).

\* cited by examiner

APPARATUS FOR COMPRESSING A WET GAS FLOW

CROSS REFERENCE TO RELATED APPLICATIONS

This application is a §371 of International PCT Application PCT/FR2013/050720, filed Apr. 2, 2013, which claims the benefit of FR1253464, filed Apr. 16, 2012, both of which are herein incorporated by reference in their entireties.

TECHNICAL FIELD OF THE INVENTION

The present invention relates to a plant for compressing a gas stream comprising at least 0.1% water, typically at least 0.1% water and at least 20% $CO_2$, and to a compression process using such a plant.

BACKGROUND

In order to reduce emissions of $CO_2$ of human origin into the atmosphere, processes for capturing the $CO_2$ generated in a given process have been developed. It is a question of extracting the $CO_2$ from a gas generated by the process, optionally purifying it and finally, in general, compressing it in order to transport it in a pipeline.

One of the routes for treating $CO_2$ consists in distilling the $CO_2$-rich gas stream in a cryogenic purification unit.

In such a unit, it is necessary to compress the incoming gas: it being possible for the incoming gas to be flue gases resulting from a process such as an adsorption purification process or a blast furnace process.

For applications that treat wet $CO_2$, that is to say comprising at least 0.1% water, the use of stainless steel compressors is recommended since the condensation of the wet $CO_2$ forms carbonic acid which is highly corrosive for carbon steels. However, the use of stainless steel compressors leads to a plant that has a high cost.

Furthermore, document FR-A-1412608 teaches a plant for intermediate cooling of compressed gas comprising compressors associated with exchangers and a cooling water circuit. The consecutive exchangers are connected in series to the cooling water circuit. Similar teaching is given by documents WO-A-2011/088527, US-A-2011/000227 and U.S. Pat. No. 7,269,956.

SUMMARY OF THE INVENTION

Hence, one problem that is faced is to provide a plant for supplying a cryogenic distillation column that has a lower cost.

One solution of the invention is a plant for compressing a gas stream comprising at least 0.1% by volume of water, comprising a compressor having N compression stages, wherein:
- each compression stage comprises a compression means and an exchanger connected directly or indirectly to a cooling water circuit C; and
- at least a first exchanger IC2 and a second exchanger IC3 of a first and of a second consecutive or non-consecutive compression stages are connected in series to the cooling water circuit C,
characterized in that the exchangers not connected in series to the cooling water circuit comprise, at their cooling water outlet, a device that makes it possible to create a pressure drop.

Depending on the case, the plant according to the invention may have one or more of the following characteristics:
- the shells of the exchangers of the n first compression stages, located on the feed side of the compressor, consist of a steel having a chromium content of less than 11% by weight and no stainless coating, with $n \leq N-1$;
- the shells of the exchangers of the n first compression stages, located on the feed side of the compressor, are made of carbon steel, with $n \leq N-1$;
- the second exchanger IC3 is also connected directly to the water cooling circuit C and a temperature regulation system makes it possible to control the mixing of the cooling water resulting from the first exchanger and of the cooling water resulting directly from the cooling water circuit C (cf. FIG. 4);
- the exchangers not connected in series to the cooling water circuit comprise, at their cooling water outlet, a device that makes it possible to create a pressure drop corresponding to the pressure drop caused by the exchangers being connected in series;
- the exchanger of the last compression stage, located on the production side of the compressor, is made of stainless steel;
- within the context of the invention, preferably $n=N-1$.
- the device that makes it possible to create a pressure drop comprises an orifice or a valve, typically a pressure drop of the order of 1 bar (or more if necessary);
- the feed plant feeds a cryogenic distillation column with a gas stream.

Another subject of the present invention is a process for compressing a gas stream comprising at least 0.1% water and at least 20% $CO_2$ using a compression plant according to the invention.

Preferably, the compression process according to the invention is characterized in that:
- the temperature of the cooling water $T_w$ of the cooling circuit C is measured;
- $T_w$ is compared to the dew point $T_d$ of the gas stream entering a second exchanger IC3 belonging to one of the N−1 compression stages located on the feed side of the compressor;
- and, if the temperature of the water of the cooling circuit $T_w$ is such that $T_w - T_d < 10°$ C.:
  - the cooling water inlet of said exchanger is connected to the cooling water outlet of a first exchanger IC2 belonging to said N−1 compression stages, located on the feed side of the compressor, and/or
  - water external to said compression plant and having a temperature $T_s > T_w$ is introduced directly into the cooling water circuit C or directly into said exchanger, so that the temperature $T_{exch}$ of the water entering said exchanger is such that $$T_{exch} - T_d \geq 10° \text{ C.}$$

Preferably, the gas stream is a stream produced by an $H_2$ PSA (pressure swing adsorption), a $CO_2$ PSA, a membrane separation process, a combustion turbine, an oxy-fuel combustion process, a cement production process, a blast furnace, a hydrogen production process or a refining process.

The solution proposed by certain embodiments of the present invention make it possible to reduce the price of the machine by avoiding the condensation of the wet $CO_2$ (that is to say comprising at least 0.1% water) in the compressor, making it possible to choose much less expensive materials, typically carbon steel.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

Figures 1, 2:
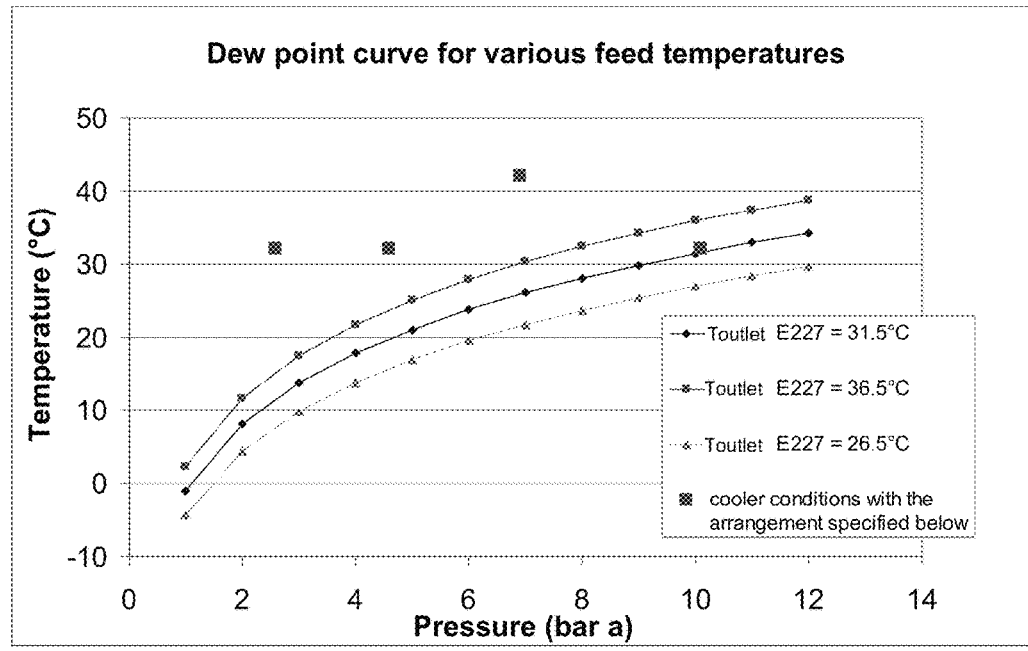
FIG. 1 gives an example of the composition of a gas stream resulting from a PSA in the production phase.
FIG. 2 gives dew point curves for the various temperatures of the gas stream.

The plant and the process according to the invention will be described in greater detail with the aid of FIGS. 1 to 3.

It should be noted firstly that the composition of the gas stream to be compressed is not constant and varies as a function of the operating phases of the PSA or blast furnace, which modifies the value of the dew point.

The minimum temperature of the gases in an exchanger is considered to be equal to the cooling water inlet temperature, corresponding to the skin temperature of the tubes of the exchanger in which the cooling water circulates. In other words, the minimum temperature of the gas stream in the exchanger will be able to be controlled by the cooling water inlet temperature.

Hence, in order to avoid the risk of condensation in the heat exchangers, a margin will be able to be constantly maintained between the conditions of the gas stream and its dew point. In order to maintain this margin, the plant according to the invention is used.

The invention will now be described in detail by taking the example of a compression plant comprising four compression stages (cf. FIG. 3) that feeds a cryogenic distillation column with a compressed gas stream.

Figure 3:
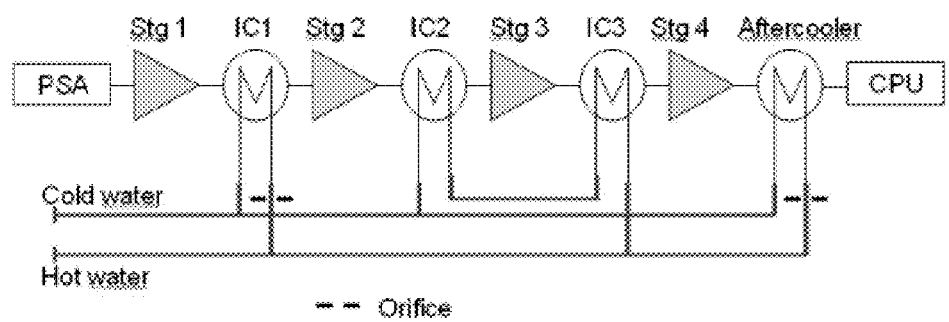
FIG. 3 shows an embodiment of the invention.
Figure 4:
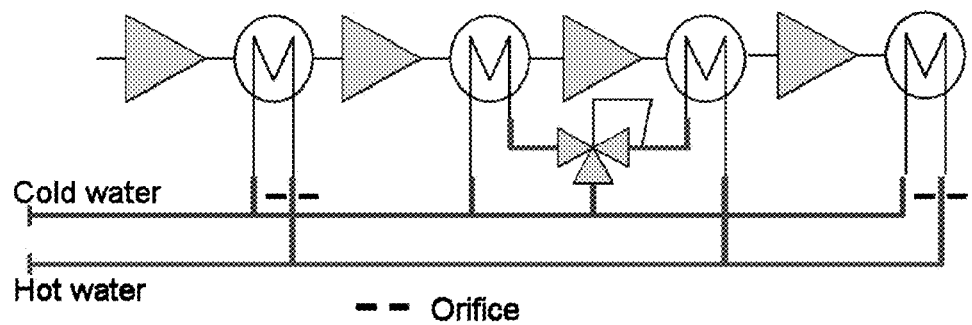
FIG. 4 shows an alternate embodiment of the invention.

The exchangers IC2 and IC3 of the second and of the third compression stage are connected in series (FIG. 3). The exchanger IC3 of the third compression stage will be referred to as "second exchanger" according to the invention while the exchanger IC2 of the second compression stage will be referred to as "first exchanger" according to the invention. In other words, the exchanger of the third compression stage is fed by the return of hot water (cooling water heated in the exchanger of the second compression stage) originating from the exchanger of the second compression stage thus allowing a sufficient margin at the dew point in the exchanger of the third compression stage and thus avoiding the risks of condensation. The temperature difference of the water between the inlet and outlet of the exchanger is generally 10° C.

The exchangers IC2 and IC3 of the second and of the third compression stage must be designed for an identical cooling water flow. A device (an orifice or a valve for example) must be installed at the outlet of the exchangers IC1 and cooler of the first and of the fourth compression stage in order to create an additional pressure drop (typically of 1 bar) corresponding to the pressure drop induced by assembling the exchangers IC2 and IC3 of the second and of the third compression stage in series.

Means for measuring the temperature, pressure and water content of the gas flow and the temperature of the water of the cooling circuit at the inlet of the exchanger of the third compression stage may be installed in order to calculate the difference between the temperature of the gas flow and its dew point.

Other arrangements are also possible for feeding the exchanger of the third compression stage with hotter water such as for example a mixture of cold and hot water through a thermostatic valve, in particular when the margin observed is not sufficient.

It should be noted that in general the first exchanger or exchangers of the first compression stages located on the feed side of the compressor do not need to receive hotter water and are connected directly to the cooling water circuit. Indeed, since the gas flow is at lower pressure, its dew point is colder and therefore further away from the nominal temperature of the cooling water. When the pressure of the gas stream increases, its dew point approaches that of the cooling water and in order to maintain a sufficient margin, the invention proposes to circulate the cooling water at least partially in series in at least two exchangers.

Regarding the means for compressing the first three compression stages, the volute casings of the compressor are made of carbon steel as for standard compressors. The impellers are made from a material made of martensitic stainless steel as for standard compressors. The exact grade is selected in order to meet the criterion of API617 (American code for machines) for applications with hydrogen-containing gas.

The exchangers of the first three compression stages are preferably shell and tube exchangers. Their shells are made of carbon steel as standard. The tubes are generally made of a copper-based material. For such an application with a closed cooling water circuit (containing corrosion inhibitors) and wet gas, the tubes are made of carbon steel. For an open or semi-open cooling water circuit, tubes made of stainless steel or copper are necessary to prevent corrosion of the water side.

Preferably, aluminum fins are installed on the tubes to improve the heat transfer and thus reduce the size of the exchanger. The tube sheet is made of forged carbon. To avoid any risk of leakage from the cooling water side to the process side which would lead to condensation and then to corrosion of the process side, a strength weld of the tube/tube sheet connection is recommended. These welds are then tested by a helium leakage test with an acceptance criterion based on a low leakage level. In order to reduce the velocity of the gas entering the exchanger, a "velocity limiter" plate is added. All the other gas side parts of the exchanger are made of carbon steel. These may be galvanized.

Drains are installed at a low point in case of condensation (in case of rupture of the tube for example). A level detector in these low points makes it possible to detect the presence of liquid in the exchanger. A water separator is installed at the outlet of each exchanger in order to prevent any drop from going to the impeller in case of condensation (in case of rupture of the tube for example). Automatic condensate traps are not necessary. Only manual valves are installed in the drain when the liquid is detected. A temperature probe in the intake pipes of the stages makes it possible to detect condensation and stop the machine.

The exchanger of the fourth compression stage (cooler) is entirely made of stainless steel (the grade 304L is a good compromise) because it is subject to much condensation. A water separator and an automatic condensate trap make it possible to remove the condensed water (having a high content of carbonic acid) from the gas. These devices must be suitable for carbonic acid.

Another subject of the present invention is a process for starting-up the compression plant according to the invention, wherein:
- a dry gas at a temperature $T_g$ above the dew point $T_d$ of the gas stream to be compressed is compressed in the compressor having N compression stages until the skin temperature of the n first compression means and of the n first exchangers in contact with the gas stream, located on the feed side of the compressor with n≤N−1, and the temperature of the water from the cooling water circuit C are above the dew point $T_d$ of the gas stream to be compressed,
- the dry gas is replaced by said gas stream to be compressed.

Preferably, the gas stream comprises at least 0.1% water and at least 20% $CO_2$, and the dry gas is nitrogen or carbon dioxide.

This start-up procedure makes it possible to heat the parts of the compressor (volute casings, pipes, exchangers, etc.) in contact with the gas stream in order to avoid condensation of the $CO_2$ and therefore corrosion of these parts.

During winter, the cooling water may be too cold and could cause condensation in the exchangers. The nitrogen start-up phase also makes it possible to heat the temperature of the cooling water to a sufficient level. The temperature of the cooling water is monitored and comes under the conditions necessary for replacing nitrogen with the process gas and also for controlling and optimizing the cooling capacity of the water system (operation/shutdown of the cooling system fans). The power of the cooling water of the cooling fan is reduced when the water is too cold with respect to the water content in the process gas.

Lastly, another subject of the present invention is a process for shutting down the feed plant according to the invention, wherein the compressor is flushed and purged with a dry gas.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step. The singular forms "a", "an" and "the" include plural referents, unless the context clearly dictates otherwise.

"Comprising" in a claim is an open transitional term which means the subsequently identified claim elements are a nonexclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary a range is expressed, it is to be understood that another embodiment is from the one.

Optional or optionally means that the subsequently described event or circumstances may or may not occur. The description includes instances where the event or circumstance occurs and instances where it does not occur.

Ranges may be expressed herein as from about one particular value, and/or to about another particular value. When such particular value and/or to the other particular value, along with all combinations within said range.

All references identified herein are each hereby incorporated by reference into this application in their entireties, as well as for the specific information for which each is cited.

The invention claimed is:

1. A compression plant for compressing a gas stream comprising a gas stream comprising a wet $CO_2$ gas stream, the plant comprising a compressor having N compression stages, wherein:
   - each compression stage comprises a compression means and an exchanger connected directly or indirectly to a cooling water circuit;
   - at least a first exchanger and a second exchanger of a first and of a second consecutive or non-consecutive compression stages are connected in series to the cooling water circuit; and
   - at least a third exchanger of a third compression stage, the third exchanger not being connected in series to the cooling water circuit, wherein the at least third exchanger comprises a device that is configured to create a pressure drop at a cooling water outlet of the at least third exchanger.

2. The compression plant as claimed in claim 1, wherein the shells of the exchangers of the n first compression stages, located on the feed side of the compressor, consist of steel having a chromium content of less than 11% by weight and an absence of a stainless coating, with n≤N−1.

3. The compression plant as claimed in claim 1, wherein the shells of the exchangers of the n first compression stages, located on the feed side of the compressor, are made of carbon steel, with n≤N−1.

4. The compression plant as claimed in claim 1, wherein the second exchanger is also connected directly to the water cooling circuit and a temperature regulation system makes it possible to control the mixing of the cooling water resulting from the first exchanger and of the cooling water resulting directly from the cooling water circuit.

5. The compression plant as claimed in claim 1, wherein the exchanger of the last compression stage, located on the production side of the compressor, is made of stainless steel.

6. The compression plant as claimed in claim 1, wherein the device that makes it possible to create a pressure drop comprises an orifice or a valve.

7. A process for compressing a gas stream comprising a wet $CO_2$ gas stream using a compression plant as claimed in claim 1.

8. The process as claimed in claim 7, further comprising the steps of:
   - measuring the temperature of the cooling water $T_w$ of the cooling circuit;
   - comparing $T_w$ to the dew point $T_d$ of the gas stream entering a second exchanger belonging to one of the N−1 compression stages located on the feed side of the compressor;
   - and, if the temperature of the water of the cooling circuit $T_w$ is such that $T_w-T_d<10°$ C.:
     connecting the cooling water inlet of said exchanger to the cooling water outlet of a first exchanger belonging to said N−1 compression stages, located on the feed side of the compressor, and/or introducing water external to said compression plant and having a temperature $T_s > T_w$ directly into the cooling water circuit or directly into said exchanger, such that the temperature $T_{exch}$ of the water entering said exchanger is $T_{exch} - T_d \geq 10°$ C.

9. The compression process as claimed in claim 7, wherein the gas stream is a stream produced by an $H_2$ PSA, a $CO_2$ PSA, a membrane separation process, a combustion turbine, an oxy-fuel combustion process, a cement production process, a blast furnace, a hydrogen production process or a refining process.

10. The process as claimed in claim 7, wherein during a startup period, the process comprises the steps of:

compressing a dry gas at a temperature $T_g$ above the dew point $T_d$ of the gas stream to be compressed in the compressor having N compression stages until the skin temperature of the n first compression means and of the n first exchangers in contact with the gas stream, located on the feed side of the compressor with $n \leq N-1$, and the temperature of the water from the cooling water circuit are above the dew point $T_d$ of the gas stream to be compressed, replacing the dry gas by said gas stream to be compressed.

11. The process as claimed in claim 10, wherein the dry gas is nitrogen or carbon dioxide.

12. The process as claimed in claim 7, wherein during a shutdown period, the process comprises the steps of flushing and purging the compressor with a dry gas.

* * * * *